United States Patent [19]

Bauer

[11] Patent Number: 5,082,310
[45] Date of Patent: Jan. 21, 1992

[54] ARRANGEMENT FOR PROVIDING AN AIR BAG DEPLOYMENT OPENING

[75] Inventor: David J. Bauer, West Bloomfield, Mich.

[73] Assignee: Tip Engineering Group, Inc., Farmington Hills, Mich.

[21] Appl. No.: 541,132

[22] Filed: Jun. 20, 1990

Related U.S. Application Data

[63] Continuation-in-part of Ser. No. 432,559, Nov. 6, 1989.

[51] Int. Cl.$^5$ .............................................. B60R 21/16
[52] U.S. Cl. .................................. 280/732; 280/731; 280/743
[58] Field of Search ............... 280/728, 730, 732, 743, 280/731

[56] References Cited

U.S. PATENT DOCUMENTS

| | | | |
|---|---|---|---|
| 3,930,664 | 1/1976 | Parr et al. | 280/732 |
| 4,097,064 | 6/1978 | Ikawa | 280/732 |
| 4,810,005 | 3/1979 | Fohl | 280/732 |
| 4,893,833 | 1/1990 | DiSalvo et al. | 280/732 |

Primary Examiner—Kenneth R. Rice
Attorney, Agent, or Firm—John R. Benefiel

[57] ABSTRACT

An arrangement and closure are disclosed for an air bag deployment opening to be formed in the interior trim structure of an automotive vehicle, the closure including a substrate section weakened in a pattern to form contiguous doors or subsections which split apart along an invisible seam or seams when an air bag is inflated to exert pressure on the inside, and hinge away from the adjacent trim structure to form the opening. A continuous foam plastic layer covers the seam or seams. A skin overlies the foam plastic layer, the skin preweakened in a matching pattern above the seam or seams by being partially cut along the inside surface to a controlled depth.

17 Claims, 7 Drawing Sheets

ARRANGEMENT FOR PROVIDING AN AIR BAG DEPLOYMENT OPENING

CROSS REFERENCE TO RELATED APPLICATIONS

This is a continuation-in-part of application Ser. No. 07/432,559, which was filed on Nov. 6, 1989 and is entitled Closure for Air Bag Deployment Opening, now abandoned.

BACKGROUND OF THE INVENTION

This invention concerns an arrangement for providing air bag deployment openings in interior trim structure. Inflatable cushion devices (commonly referred to as "air bags") have been devised for automotive vehicles, in which one or more air bags are stowed in respective storage spaces located within the passenger compartment. Typically a driver's side air bag is stored in a compartment in the center of the steering wheel and a passenger's side air bag is stored in a compartment behind the instrument panel. Upon detection of a relatively severe collision, the air bag or bags are very rapidly inflated to be deployed in positions to cushion the driver and/or passengers from injury-causing contact with the interior structure of the auto.

The air bags must be neatly stowed out of sight and so as to be resistant to tampering, yet able to deploy into the passenger compartment in an instant. This requires a sturdy closure panel for the deployment opening, which preferably minimizes the visual impression of the presence of the closure, and yet reliably opens under the wide range of ambient temperature conditions for which the auto is designed for use, over the entire useful life of the car.

Such closures are usually opened by the force exerted by the inflating air bag, and the deployment of the air bag must not be appreciably slowed by resistance to the opening of the closure. The considerable force applied by the inflating air bag must not result in fragmentation or separation of the closure, lest debris be projected towards persons in the passenger compartment.

The closure is of necessity exposed within the auto interior, and thus must be aesthetically compatible with the auto interior trim.

A vinyl skin covering is commonly applied to the instrument panel and other trim panel surfaces. Plastics such as vinyl while durable are relatively tough and resistant to tearing.

There has heretofore been proposed such closures in which doors are formed by a substrate panel overlain by a vinyl skin, with the skin ruptured by the deploying air bag forcing the substrate panels open. While preweakening of the skin has been utilized to facilitate tearing, it is difficult to achieve reliable tearing at the appropriate force level. U.S. Pat. No. 3,640,546 discloses a closure in which a pair of doors are covered by a covering skin, preweakened along a line of separation; which is ruptured when the doors are forced opened by the deploying air bag. The line of weakening is described as being accomplished by a reduction in thickness, perforating, or heating. Such a joint is not sufficiently sturdy to resist inward pressure applied by an occupant and also results in a visible seam. Furthermore, a consistent control over the depth of cut when scoring vinyl is not easily obtained, and a proper bursting strength is difficult to reliably achieve in production.

Other approaches have included positioning piercing pieces forced into the skin to initiate tearing action, but this creates a complicated design.

SUMMARY OF THE INVENTION

The present invention comprises a combination of upper and lower rigid door panel portions formed in a substrate member, each door panel supported on hinging sections extending along the sides remote from each other. A thin frangible bridging portion of the substrate member extends across the gap between the adjacent sides of the upper and lower door panel portions to form a seam. A layer of foam overlies both door panel portions extending across the seam, and a decorative skin overlies the foam layer. The skin is scored from the inside to a consistently controlled depth along the seam. A successive breaking of the bridging portion, foam layer and scored skin at the seam is achieved as the deploying door exerts an outward pressure on the panel portions.

A network of ribs stiffens the door panels to insure proper exertion of pressure at the seam, and a raised edge along the seam insures that an adequate force is applied by the door panel portions to the frangible structure along the seam. Also, the foam thickness is reduced at the seam by the raised contouring of the adjacent edge of each door panel.

In a first version, the substrate member is formed by a molded rigid plastic, having an integral thin web forming the bridging portions.

In a second version, the substrate member is comprised of formed metal such as aluminum having a thick piece of a lightweight rigid foam plastic such as Dytherm plastic attached to each door panel portion to stiffen the substrate and provide a raised contact surface for engagement by the air bag. In this second version, narrowed sections of the rigid foam plastic piece and areas of the metal intermediate slots extending along the seam comprise the bridging portions.

This construction allows a low cost, durable closure construction which is well matched to adjacent trim structure and has a well supported invisible parting seam, and which insures reliable opening under pressure from an inflating air bag.

A special skin scoring method is employed to establish consistent control over the depth of the score, comprised of supporting the skin on a compressible support bed during scoring, passing a scoring knife through the inside of the skin which guides the knife on guide elements moving along while head against the inside surface. The compressible support bed allows relief of compressive stresses otherwise imposed on the skin material to insure a uniform scoring depth.

The present invention also comprises an arrangement for forming an opening in an interior trim structure including a substrate member. The arrangement includes a door panel substrate section connection either integrally or separately to the interior trim substrate member.

A pattern of lines of weakening in the substrate section divide it into subsections contiguous with each other. The sides contiguous with the adjacent trim structure substrate member form hinging sections.

A smooth layer of foam overlies both the substrate member and door panel substrate section, with a decorative skin overlying both, scored from the inside in a pattern matching the lines of weakening in the substrate section to form an exteriorly invisible frangible seam in the trim structure.

The pressure exerted by the deploying air bag splits the seams and allows the subsections to fold back and form a deployment opening.

DETAILED DESCRIPTION

In the following detailed description, certain specific terminology will be employed for the sake of clarity and a particular embodiment described in accordance with the requirements of 35 USC 112, but it is to be understood that the same is not to be limiting and should not be so construed inasmuch as the invention is capable of taking many forms and variations within the scope of the appended claims.

Figure 1:
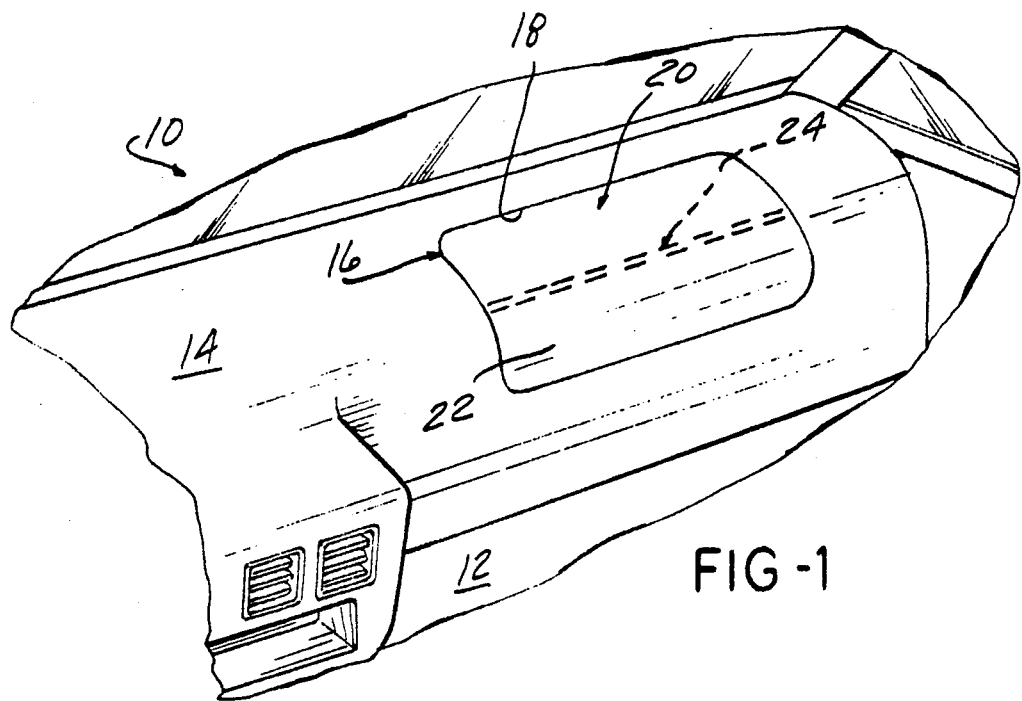
FIG. 1 is a fragmentary perspective view of an auto interior with an instrument panel formed with an air bag deployment opening closure according to the present invention.

Referring to FIG. 1, a fragmentary view of the passenger compartment 12 of an automobile 10 is depicted, including an instrument panel 14 forming a part of the interior trim structure. Typical air bag systems include a separate air bag for the driver and passenger sides of the passenger compartment. The driver's side air bag is usually housed within a receptacle in the steering wheel and the passenger side air bag is contained within a receptacle located behind the instrument panel 14. The closure of the present invention may be applied to either the driver's or passenger's side, but will here be illustrated as on the passenger's side.

A closure 16 according to the present invention is fit within an opening 18 in the instrument panel 14, the closure including an upper door 20 and a lower door 22 able to separate along a seam 24, each door hinging open upwardly and downwardly respectively to create a deployment opening through which an inflating air bag can enter the passenger compartment 12.

As will be described, the seam 24 is designed to be invisible to a person within the passenger compartment 12.

Figure 2:
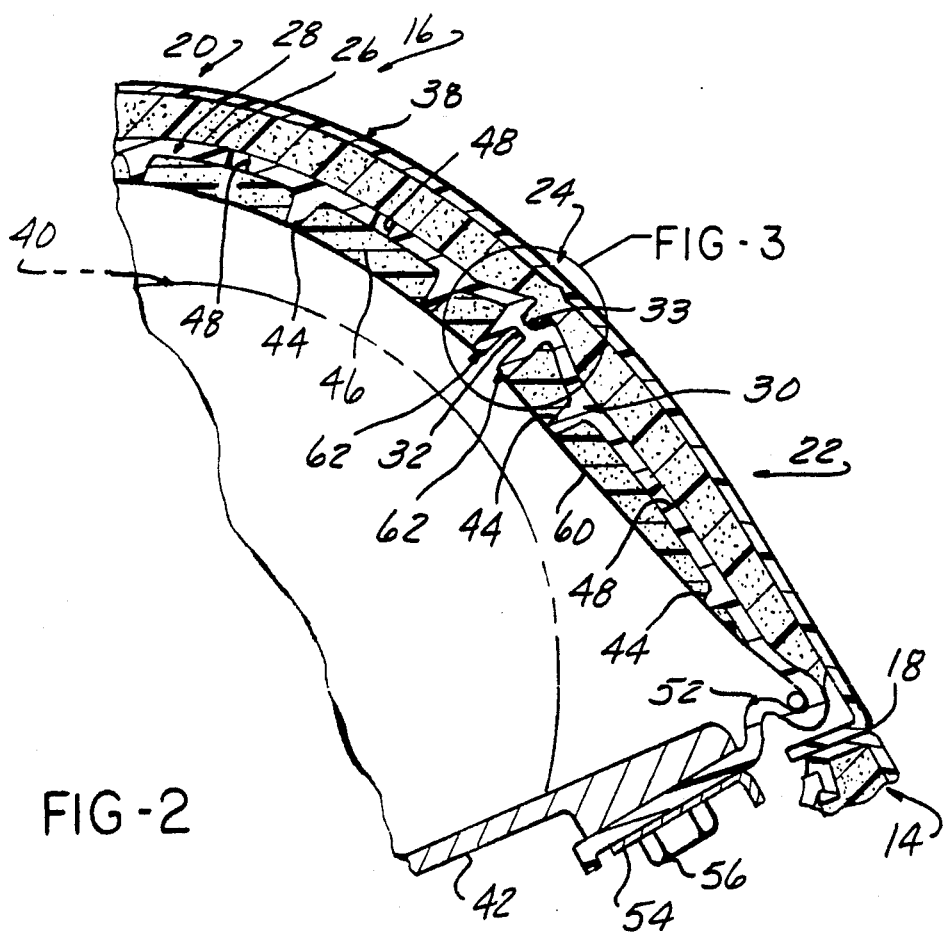
FIG. 2 is an enlarged fragmentary transverse sectional view taken through the closure and adjacent instrument panel structure shown in FIG. 1.
Figure 3:
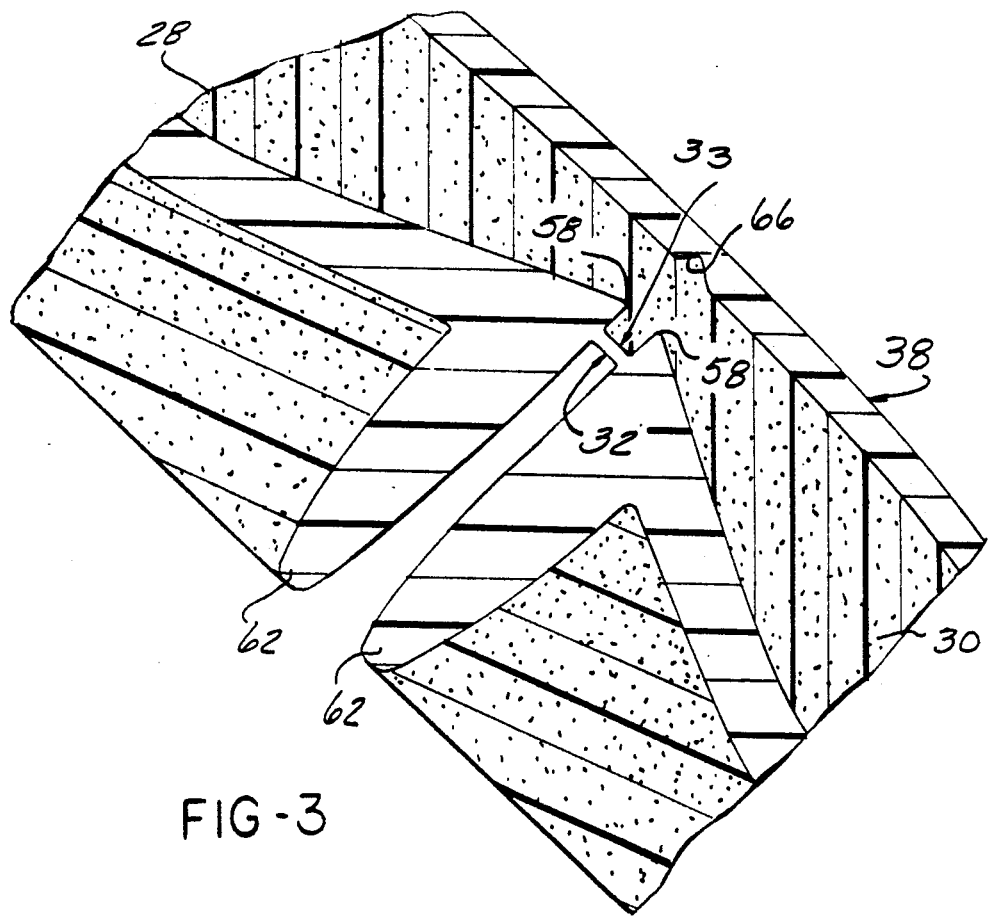
FIG. 3 is a further enlarged transverse sectional view through the panels showing the details of the seam.

Referring to FIGS. 2 and 3, the closure 16 includes a one piece molded substrate member 26 having an upper door portion 28 and lower door portion 30 connected along the seam 24 by an integral thin frangible bridging portion 32 extending across a gap 33 between the upper door 20 and lower door 22.

The substrate member 26 is enclosed in a mass of foamed plastic 34 having layers extending over and under the opposite sides of the substrate member 26. The foamed plastic 36 extends over the gap 33.

A decorative skin layer 38 as of thin, flexible vinyl plastic sheet, is wrapped and bonded (by the heat of injection of the foam 36) in position overlying the outside layer of foam plastic deposited over both upper door 20 and lower door 22, extending over the seam 24. Since the skin layer 38 is supported by the foam 36 along the seam 24, the seam 24 will be invisible to an occupant of the auto.

The substrate member 26 is relatively rigid, the upper door portion 28 and lower door portion 30 defining structural members able to effectively transfer a shearing force to the frangible bridging portion 32. The opening pressure is exerted by the inflating air bag 40 stored behind the closure 16, folded within a cannister 42.

The substrate member 26 is preferably of a low density olefin plastic such as polyethylene, and a grid network is formed on the inner face by an orthogonal array of molded ribs 44 forming rectangular open compartments 46.

Since it is difficult to securely bond foamed plastic to low density olefin plastics such as polyethelene, a mechanical interlocking is employed to secure the mass of foamed plastic 36 to the substrate, as disclosed in detail in copending application Ser. No. 07/432,559 filed on 11-06-89, Attorney Docket No. TIP-122. This mechanical interlock is created by injecting foamed plastic through openings 48 extending through the substrate member 26 into each compartment 46, so as to interconnect the layers of foam 36 on either side of the substrate member 26.

The substrate member 26 is also formed with hinging sections 50, 52 integral with the portions within the upper door 20 and lower door 22 respectively.

Each hinging section 50, 52 is attached to an opposite side of the air bag cannister 42 as with a clamping plate 54 and rivets 56. The hinging sections 50, 52 are formed with convoluted shape along the connected sides of the upper door 20 and lower door 22. This shape allows the doors 20, 22 to be pushed out and clear the adjacent instrument panel structure 14 prior to hinging opening of the doors 20, 22. This eliminates any interference therebetween due to the close fitting of the doors 20, 22 within the opening 18.

The substrate member 26 is curved in conformity with the shape of the instrument panel 14, but in the region of the seam 24 is contoured with an edge 58 angled outwardly, while the mass of foam 36 and skin 38 continuously extend in that region. Thus, a reduced thickness of foam is located over the gap 33, and acute edges 58 assist severing of the reduced thickness of foam and the skin 38. The edge 58 also serves to stiffen the panel portions 28, 30, to enable effective application of the bursting pressure to the foam 36 and skin 38 at the seam.

The substrate member 26 is formed with raised ridges 60 extending along the sides and ridges 62 along the door panel portions 28 and 30. Preferably, the ridge 60, and the ridge 62 are raised at the seam 24 to insure initial contact with the air bag inflating from 40 to exert maximum shearing pressure on the bridging portion 32, foam 36, and skin 38 above the gap 33.

A critical aspect of the present invention is the preweakening of the inner side of the decorative skin along the seam 24. This is accomplished by a scoring or partial cutting of the skin layer 38 to a controlled depth, indicated by the groove 66.

A sequenced severing of the components of the seam 24 is carried out by the pressure of the inflating air bag 40 acting on the inner face of the upper and lower doors 20, 22.

The ridges 62 pivot together and thereafter the stress applied to the bridging portions 32 causes them to break, and thereafter the thickness of foam 36 and the preweakened skin 38 is severed to allow each of the upper door 20 and lower door 22 to hinge open. In a typical application, the cut 66 is approximately one half of the total thickness of the skin layer 38.

It is important that each door 20, 22 be sufficiently rigid to effectively transmit the shearing forces to the bridging portion 32 and the preweakened skin 38. If the doors were compliant, breakage of the frangible seam elements would be slightly delayed to adversely affect performance of the air bag system.

Figure 5:
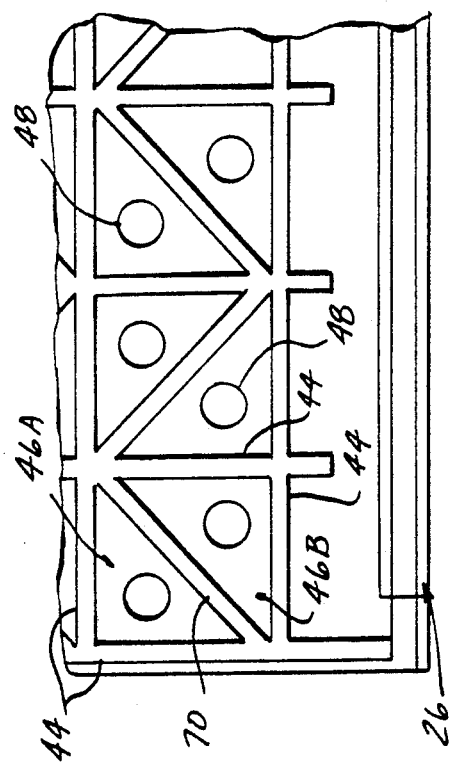
FIG. 5 is a fragmentary plan view of an alternate construction of the door panel substrate member.

The rib pattern can be made more rigid by providing additional cross ribs 70 extending diagonally as shown in FIG. 5, across the ribs 44, with additional holes 48 enabling foam to enter each compartment 46A, 46B formed by diagonal rib 70.

Figure 6:
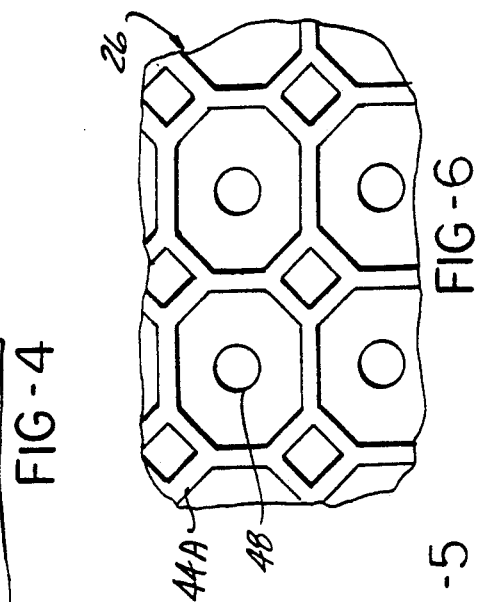
FIG. 6 is a fragmentary plan view of yet another alternate embodiment of the door panel substrate member.

A hexagonal or octagonal rib geometry can also be employed as shown in FIG. 6, in which angled ribs 44A create the hex or octagon shape. This likewise increases the rigidity of the substrate member 26 if necessary for a particular application.

Figure 7:
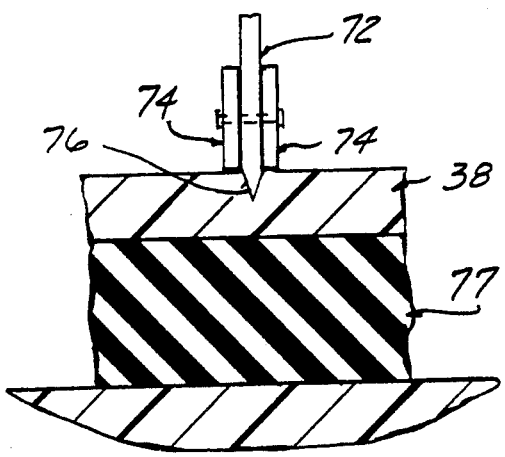
FIG. 7 is a greatly enlarged transverse sectional view of vinyl skin material undergoing scoring the inside surface prior to assembly into the closure according to the present invention.

It is critical that the partial cutting of the inside of the skin 38 be consistently held to the designed-for depth. FIG. 7 illustrates how this can be effectively done. A suitable cutting blade 72 has mounted to it guide elements 74 such as rollers adapted to rest on the surface of the skin 38 as the blade 72 traverses the skin 38. The distance below the surface of the skin 38 that the cutting edge 76 protrudes corresponds to the depth of cut, and should be set accordingly.

According to one aspect of this method, substantial compression of the skin material below the cutting edge 76 should be avoided in order to achieve a consistent depth. This requirement may be met by placing the skin 38 on a bed of a more easily compressed material than that of the skin, i.e., for example a layer of neoprene 77 rubber may be placed beneath a vinyl skin 38. This allows a slight deflection of the vinyl skin away from the cutting edge 76 to relieve excessive compression leading to erratic and inconsistent results.

Figure 8:
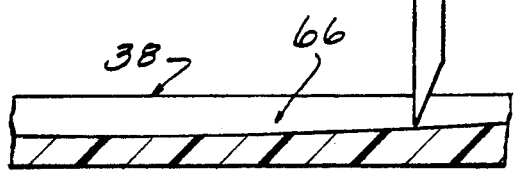
FIG. 8 is a fragmentary lengthwise view of a scored section of skin showing a varied depth scoring across the width of the closure.
Figure 4:
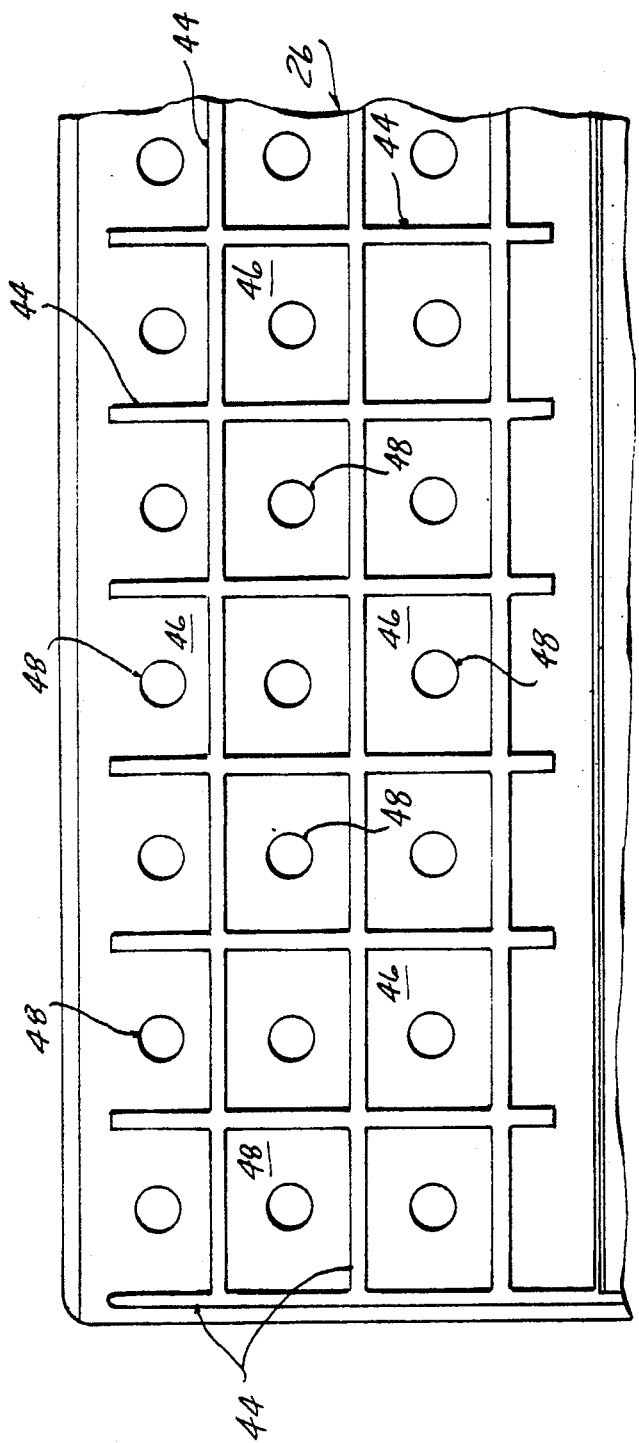
FIG. 4 is a perspective view of a one piece molded door panel substrate member assembly incorporated in the door panels shown in FIGS. 1-3.

The partial cutting of the inside of the skin 38 can also be varied across the width of the disclosure, from a maximum depth at the center to a reduced depth at either side as shown in FIG. 8. This can be done by varying the depth of the cut 66, as by a cam control 78 or other arrangement. This configuration can insure beginning of the tear at the center and propagation to either side.

As noted above, the substrate member should be stiff and thus much thicker than the skin 38, which is much thinner than the outer foam layer. An approximate proportion is that the skin is slightly over one half of the thickness of the substrate member 26. The thickness of the foam plastic layer 36 would normally be about five times the skin layer thickness, but reduced to about the same depth along the seam.

Figure 9:
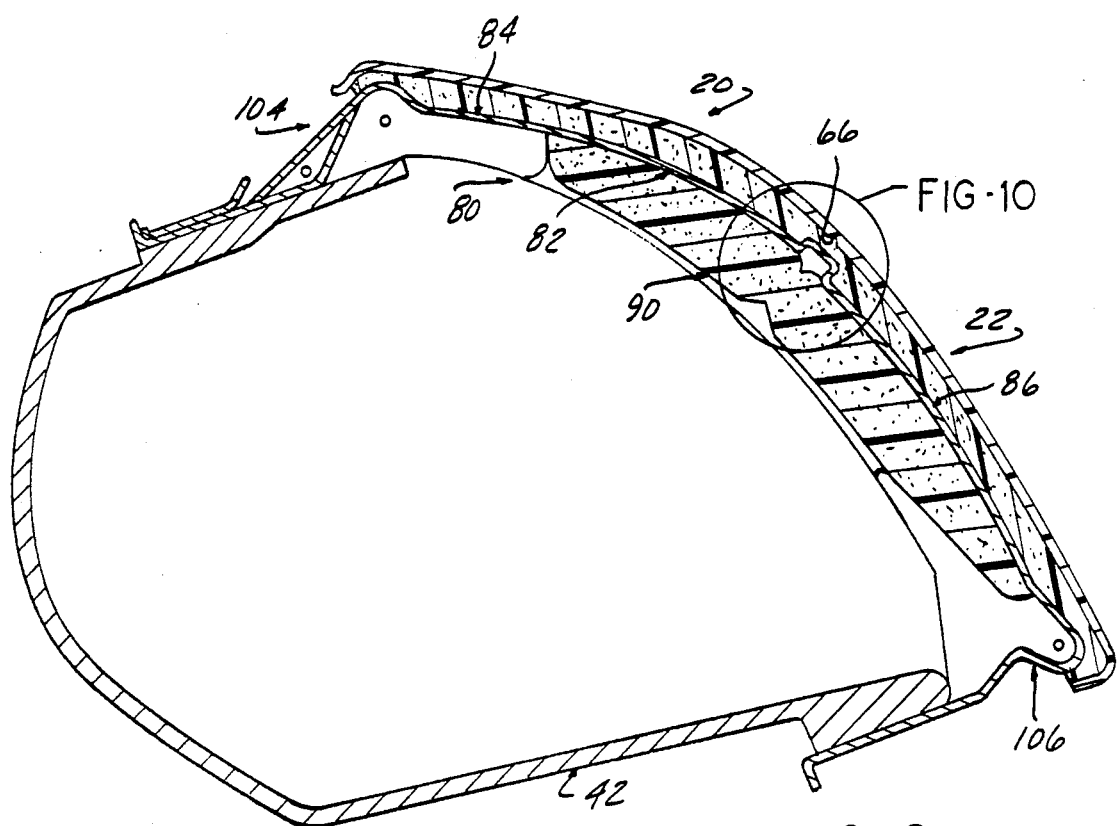
FIG. 9 is a transverse sectional view taken through an alternate embodiment of a closure according to the present invention.
Figure 10:
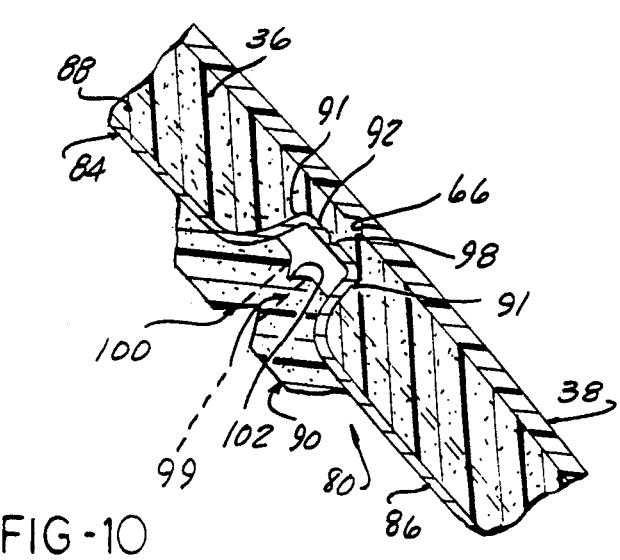
FIG. 10 is an enlarged view of the region of the closure shown in FIG. 9 adjacent the seam.
Figure 11:
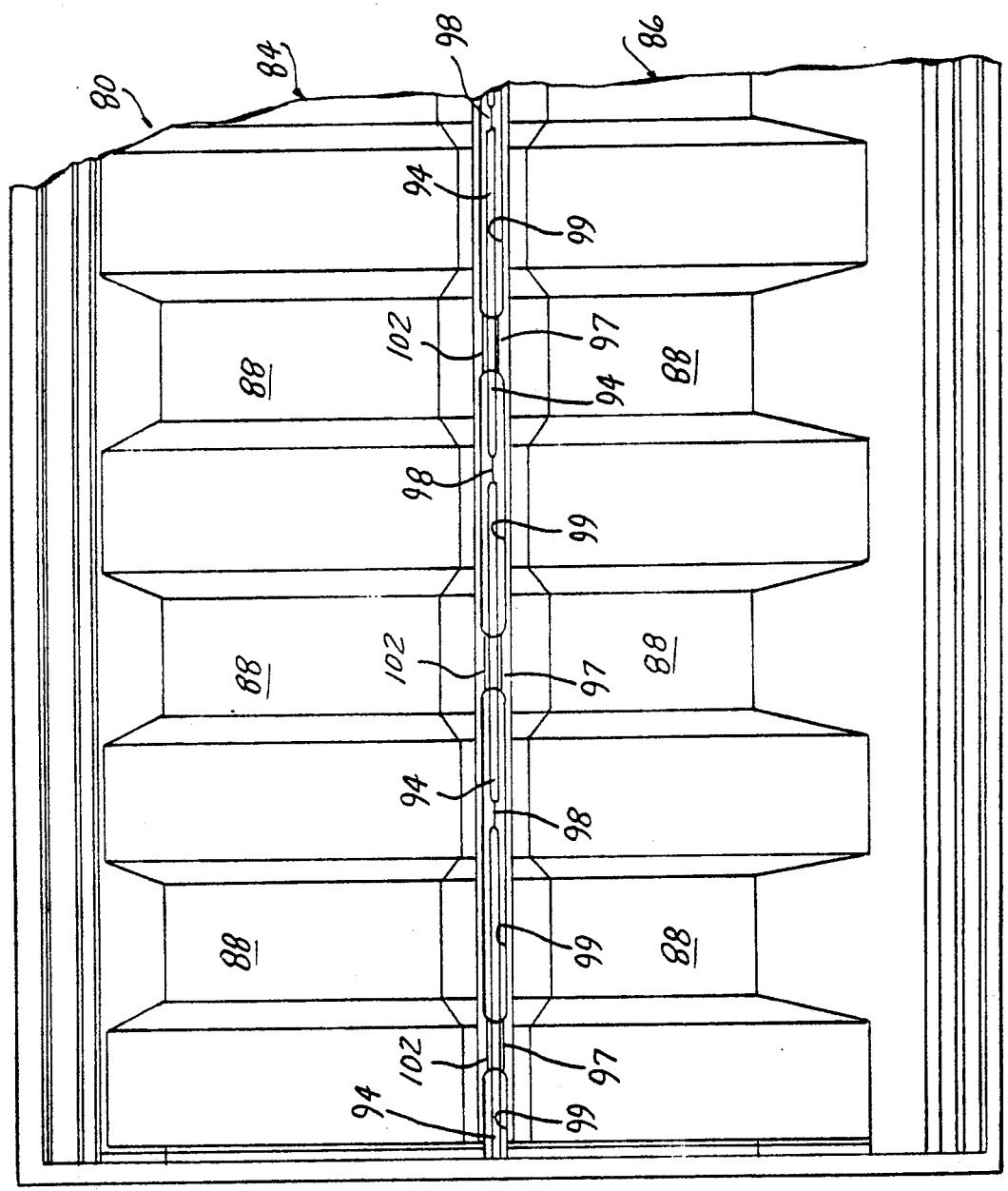
FIG. 11 is a fragmentary rear plan view of the formed sheet metal element incorporated in the closure shown in FIGS. 9 and 10.

FIGS. 9-11 depict application of the invention to a stiffened metal type of substrate member. In this embodiment, a substrate member 80 is provided comprised of a formed sheet metal member 82, preferably of aluminum having an upper door panel portion 84 and a lower door panel portion 86. Each door panel portion 84, 86 is formed with front to back extending depressions 88 (FIG. 11) acting to stiffen the same. A complementarily shaped stiffener piece of a rigid light weight plastic such as Dytherm (trademark) is affixed to the backside of substrate member 80 fit into the depressions 88, and acting to further stiffen the door panel portions 84, 86. Each door panel portion 84, 86 is shaped with a formed edge 81 along the adjacent sides, with a bridging portion 92 joining the same, forming a generally hat shaped raised section. The bridge portion 92 has slots 94 (FIG. 11) formed along the center thereof, leaving only localized sections 96, which are further weakened by grooving 98, thus greatly weakening the bridging portion 92 of the metal layer extending along the seam between the door panel portions 84, 86.

The stiffener piece 90 is also weakened along the seam by slots 99 and grooves 100, 102 formed into the inside and outside surface of the solid areas 97 intermediate the slots 99 thereof respectively, to substantially reduce its thickness to promote shearing along the seam.

As in the above described embodiment, a layer of foam plastic 36 overlies the outside surface of the sheet metal member 82, extending continuously over the bridging section 91, 92 to be of reduced thickness at the seam. The foam 31 may be adhesively bonded to the metal member 82. A decorative skin layer 38 grooved on the inside at 66 is also provided as in the above embodiments.

The sheet metal member 82 includes bendable hinging sections 104, 106 integral with the upper and lower door panel portions 84, 86 respectively attached to the sides of the air bag cannister 42.

Figure 12:
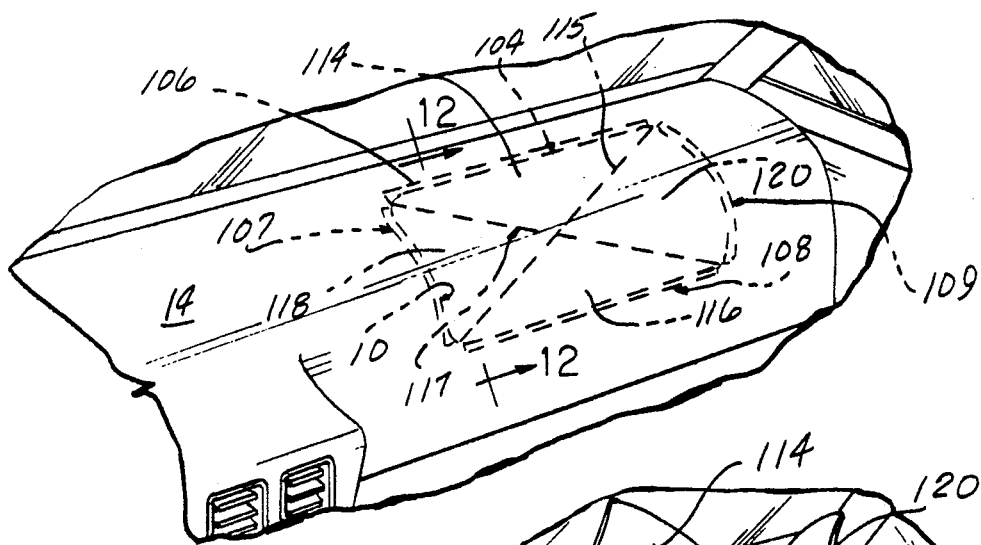
FIG. 12 is a perspective fragmentary view of an instrument panel incorporating an arrangement of an air bag deployment opening closure according to the present invention.
Figure 14:
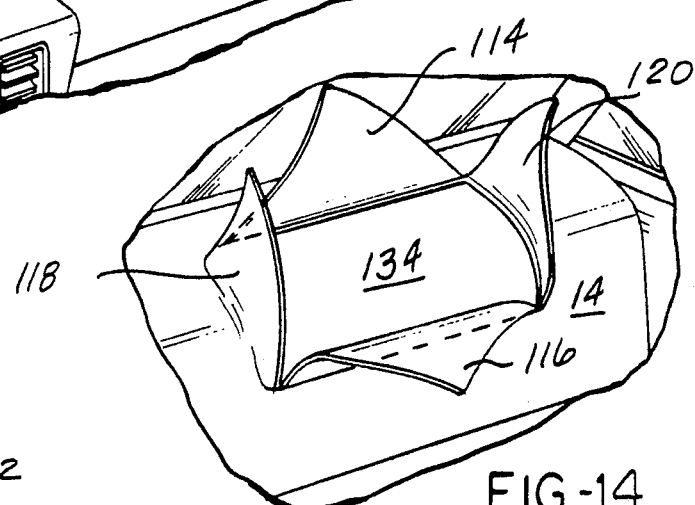
FIG. 14 is a perspective fragmentary view of the instrument panel shown in FIG. 12 with the closure opened.
Figure 13:
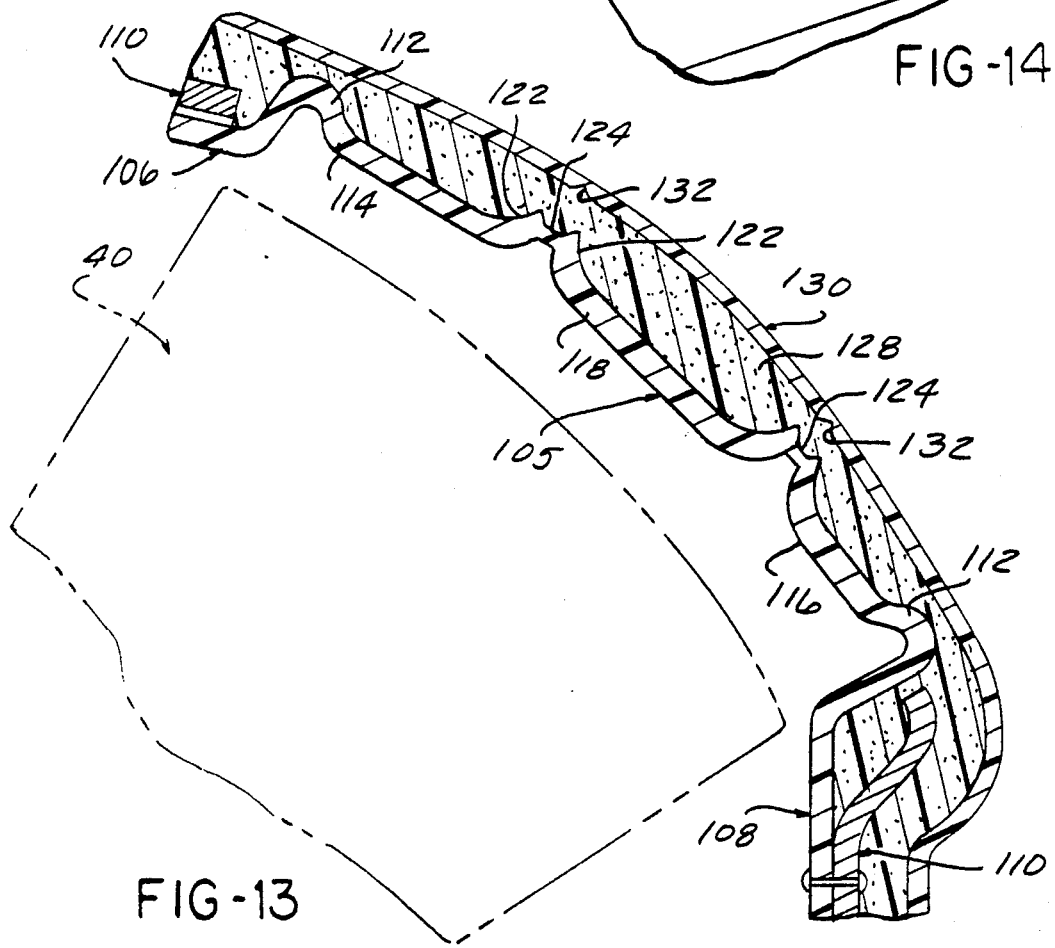
FIG. 13 is an enlarged view of the section 13—13 taken in FIG. 12.

FIGS. 12-14 show another embodiment where a completely invisible seam is achieved about the entire perimeter of an air bag deployment door panel 104 mounted in the instrument panel 14 so that the entire opening 10 is rendered invisible in a smooth expanse of the surface of the instrument panel 14.

The door panel 104 comprises a molded plastic, substrate section 105 mounted within the instrument panel 14 and having upper and lower horizontal flanges 106, 108 and left and right flanges 107, 109 connected to a substrate layer 110 of the instrument panel 14. A hinging section 112 is integral with each of the flanges 106-109, located above the respective flange 106-109 and substrate 110 to enable a respective subsection 114, 116, 118, 120 of substrate section 105 to hinge freely past the adjacent edge of the substrate 110.

Alternatively, substrate section 105 could be made to be integral with the instrument panel substrate layer 110.

In order to completely eliminate the right angle corners which require considerable energy to tear around, the door panel subsections 114-120 are in this embodiment formed by a crossing pattern of lines of weakening 115, 117 triangular in shape, with the inwardly convergent sides contiguous to the adjacent subsections to divide the substrate section 105. The base of each triangular subsection 114-120 is connected to the adjacent portion of substrate member 110 by the hinging section 112. Adjacent sides of the subsections 114-120 are separated by a pair of lines of weakening arranged in a crossing pattern across the section 105 to form the triangular shape of the subsections 114-120. Upturned ridges 122 on either side of gaps are bridged with thin, frangible connecting webs 124 to form the lines of weakening. The webs 124 are chosen to be thin enough to be readily sheared by the pressure exerted by the air bag in deploying from the cannister 40 mounted beneath the instrument panel 14 and door panel 104, as by bracketry (not shown).

The substrate section 105 may be attached to the instrument panel substrate 110 as by suitable fasteners 126, prior to the molding thereto of a continouous layer of foam 128 exteriorly smoothly contoured and application of a decorative skin layer 130. As noted, the section 105 may alternatively be of integral construction.

The skin layer 130 is partially cut from underneath with grooves 132 extending in a pattern of crossing lines located aligned with and matching the pattern of weakening webs 124 forming.

The grooves 132 in the skin 130 are formed as described above. Thus, the reduced foam thickness above the webs 124 and the skin prescoring groove 132 create exteriorly invisible frangible seams between subsections 114-120.

Upon system activation, the door panel subsections 114-120 are split apart at the lines of weakening, and hinged back to be able to be forced open in flower petal fashion, exposing the opening 10 in the instrument panel substrate member 110 to allow the air bag to deploy therethrough.

Figure 15:
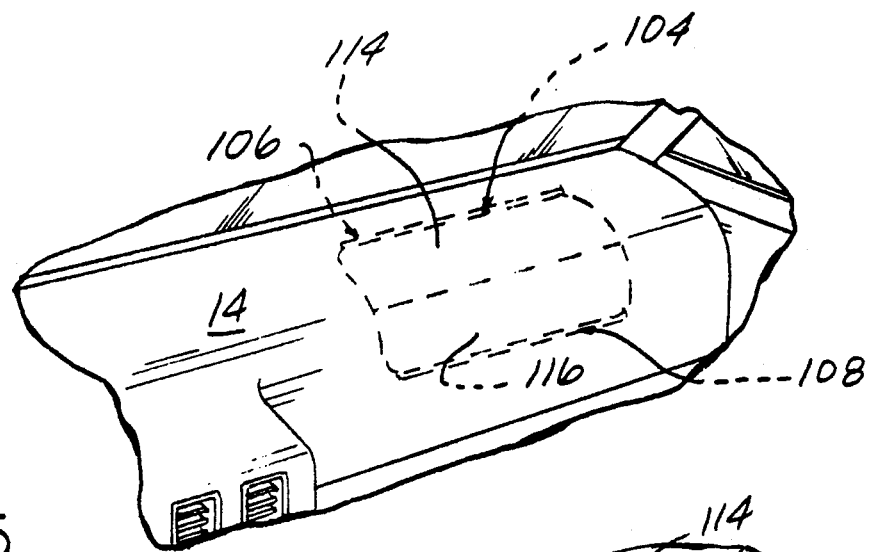
FIG. 15 is a fragmentary perspective view of an instrument panel having an air bag opening closure according to another form of the present invention.
Figure 16:
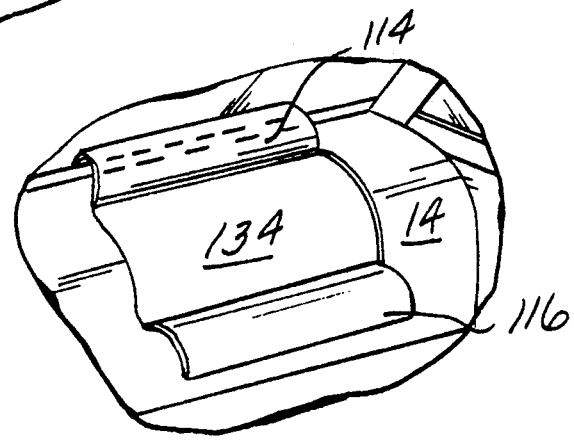
FIG. 16 is a fragmentary view of the closure shown in FIG. 15, in the opened condition.
Figure 17:
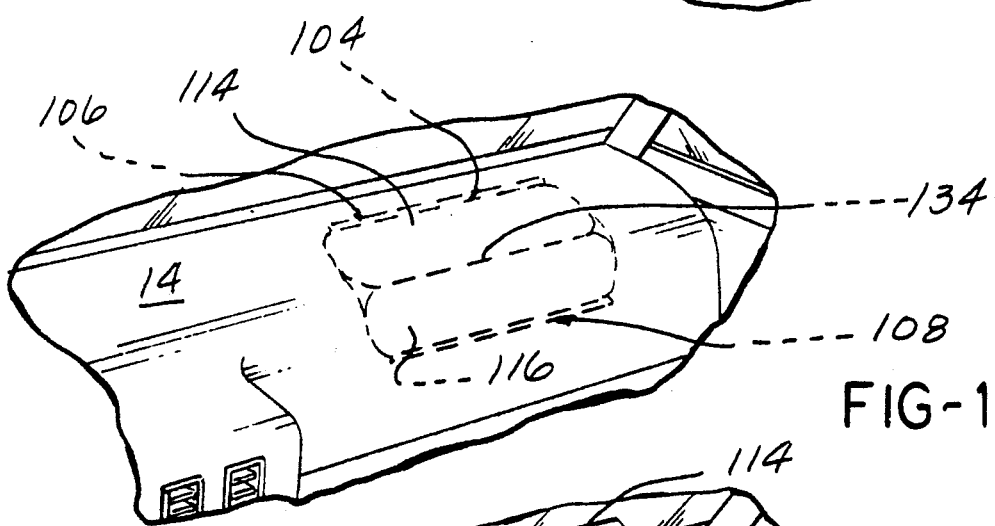
FIG. 17 is a fragmentary perspective view of an instrument panel having an air bag opening closure according to yet another form of the present invention.
Figure 18:
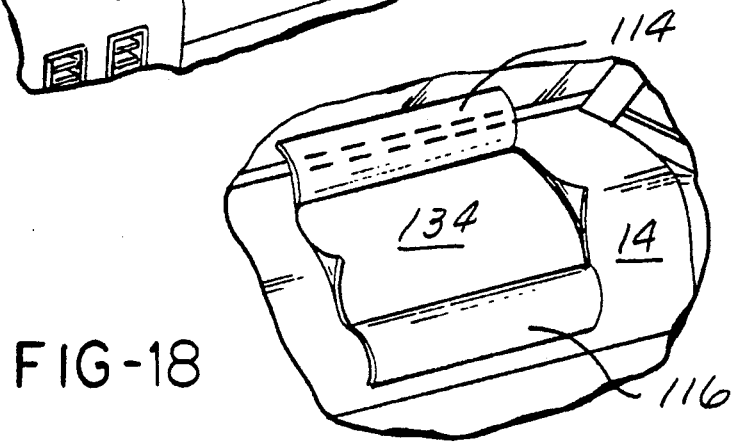
FIG. 18 is a view of the closure shown in FIG. 17 in the open condition.

The crossing pattern of the lines of weakening creates maximum weakness at the center to initiate tearing at this point, and provides an infinite radius at the "corners" which no longer exist. A minimally radiused corner may also be employed depending on the pliability of the covering material and the ease with which it may be torn, as shown in FIGS. 15 and 16. Thus, other patterns may be employed, such as opposing curved vee patterns either coming together at a point or connected by a horizontal line 134 of varying lengths as shown in FIGS. 17 and 18.

It will be appreciated that this embodiment allows a completely invisible air bag deployment door panel to be provided as a part of the instrument panel, to deter tampering and improving the appearance of the interior trim.

Accordingly, a reliably operating mechanical break for a skin encased closure has been provided by the closure described to achieve the advantages of the invention as described above.

I claim:

1. A closure for covering an air bag deployment opening formed in the interior trim structure of an automotive vehicle, said closure including:
   a substrate member having upper and lower door panel portions, said portions having adjacent sides separated by a gap, with a frangible bridging portion connecting said upper and lower door panel portions extending across said gap;
   a skin smoothly overlying said substrate member, extending across said door panel portions, and said gap therebetween, said skin partially cut from the inside along said gap but smooth and uninterrupted on the outside; an uninterrupted foam plastic layer lying beneath said skin and atop said substrate member, extending across said seam and completely filling the space therebetween, whereby said bridging portion and said partially cut skin form a frangible seam between said upper and lower door panel portions.

2. The closure according to claim 1 wherein said substrate member is formed with a raised contour extending along each adjacent side of said upper and lower door panels reducing the depth of foam plastic at said seam.

3. The closure according to claim 1 wherein said substrate member is formed with a grid pattern of ribs projecting from the inside surface thereof.

4. The closure according to claim 3 wherein a layer of plastic foam is deposited on both the inside and outside of said substrate member, interlocked through holes in said substrate member.

5. The closure according to claim 4 wherein said hinging means comprises integral hinge sections formed along said opposite sides of said upper and lower door panel portions of said substrate member.

6. The closure according to claim 5 wherein said substrate member comprises a molded plastic member having said ribs and hinging sections integral therewith.

7. The closure according to claim 1 wherein said skin is cut deeper at the center and of a reduced depth towards either side thereof.

8. The closure according to claim 3 wherein ribs in said grid pattern reduce in height from the seam to the opposite sides of said upper and lower door panel portions.

9. The closure according to claim 1 wherein said substrate member comprises a layer of formed metal having a stiffener piece attached thereto on the inside surface, said layer of formed metal having a bridging portion extending across said gap, said bridging portion being slotted to form localized connecting sections.

10. The closure according to claim 9 wherein said localized connecting sections are grooved to be weakened.

11. The closure according to claim 10 wherein said stiffener piece is formed of rigid plastic and extends across said gap; said stiffener piece having slots with intermediate solid areas along the width of said door panel portions, said solid areas grooved along the region of said gap to be further weakened.

12. A method of cutting a compressible plastic sheet layer along a line to a controlled, partial depth, including the steps of positioning said layer atop a support bed of material being more easily compressed than the material of said plastic sheet layer;

drawing a cutting blade along the upper surface of said plastic sheet layer along said line at a predetermined depth in said layer, whereby any compression of said layer is relieved by deflection of said support bed material.

13. The method according to claim 12 further including the step of guiding said cutter by holding guide elements attached to said cutting blade against the upper surface of said layer.

14. The method according to claim 13 wherein said plastic sheet layer is of vinyl and said support bed is of more compressible rubber.

15. An arrangement for providing an air bag deployment opening to be formed in the interior trim structure of an automotive vehicle, said interior trim structure including a substrate section, said closure including:

a generally rectangular door panel including a substrate section connected to said interior trim substrate member, said substrate section divided into a plurality of contiguous subsections, said subsections having adjacent sides separated by a line of weakening, with frangible bridging portions connecting said contiguous portions of said subsections;

a flange portion on one side of each subsection connected to said interior trim substrate member to enable all of said subsections to hinge away from said substrate member and form an opening thereon;

a skin overlying said trim structure substrate member, smoothly extending over said opening and said substrate member, said skin partially cut from the inside in a pattern matching and aligned with said pattern of lines of weakening in said substrate section, whereby;

a continuous uninterrupted foam layer lying beneath said skin and stop both interior trim substrate member and said door panel substrate section, extending across said opening in an uninterrupted expanse smoothly contoured to the outside;

said bridging portions and said partially cut skin form a pattern of frangible seams allowing said subsections to be split apart and forced out to form said opening and allow deployment of an air bag therethrough.

16. The arrangement according to claim 15 wherein said door panel substrate section is formed with a raised contour extending along said pattern of lines of weakening reducing the depth of foam plastic above said line of weakening.

17. The arrangement according to claim 15 wherein said door panel substrate section subsections comprise four interfitting sections formed by a pattern of four lines of weakening each originating at a corner of said door panel, each of said subsections having said flange portion extending from the side thereof at the perimeter of said door panel.

* * * * *

UNITED STATES PATENT AND TRADEMARK OFFICE
CERTIFICATE OF CORRECTION

PATENT NO.   : 5,082,310
DATED        : January 21, 1992
INVENTOR(S)  : David J. Bauer It is certified that error appears in the above-identified patent and that said Letters Patent is hereby corrected as shown below:

<u>Column 10,</u>
Line 10, delete "stop" and insert therefor -- atop --

Signed and Sealed this

Third Day of February, 2004

JON W. DUDAS
*Acting Director of the United States Patent and Trademark Office*